US008559198B2

(12) United States Patent
Carralero et al.

(10) Patent No.: US 8,559,198 B2
(45) Date of Patent: Oct. 15, 2013

(54) HIGH YIELD AC-AC POWER CONVERTER AND METHOD THEREFOR

(75) Inventors: Michael A. Carralero, Huntington Beach, CA (US); Jimmy M. Quiambao, Walnut, CA (US)

(73) Assignee: The Boeing Company, Chicago, IL (US)

( * ) Notice: Subject to any disclaimer, the term of this patent is extended or adjusted under 35 U.S.C. 154(b) by 219 days.

(21) Appl. No.: 13/156,254

(22) Filed: Jun. 8, 2011

(65) Prior Publication Data
US 2012/0314460 A1    Dec. 13, 2012

(51) Int. Cl.
*H02M 5/45* (2006.01)
*H02M 5/40* (2006.01)

(52) U.S. Cl.
USPC .............................. 363/37; 363/34

(58) Field of Classification Search
USPC ........... 363/17, 34, 37, 39, 61, 81, 84, 88, 95, 363/98, 125, 131, 132
See application file for complete search history.

(56) References Cited

U.S. PATENT DOCUMENTS

| 4,443,759 | A | * | 4/1984 | Isaacson et al. ............... 324/216 |
| 5,018,058 | A | * | 5/1991 | Ionescu et al. .................. 363/34 |
| 5,451,962 | A | * | 9/1995 | Steigerwald .................. 342/175 |
| 6,021,052 | A | * | 2/2000 | Unger et al. ..................... 363/26 |
| 6,608,401 | B1 | * | 8/2003 | Walter ............................. 307/39 |
| 2003/0012393 | A1 | * | 1/2003 | Armstrong .................... 381/321 |
| 2004/0066663 | A1 | * | 4/2004 | Raichle ........................... 363/40 |
| 2008/0304300 | A1 | * | 12/2008 | Raju et al. ..................... 363/126 |
| 2009/0034300 | A1 | * | 2/2009 | Ito et al. ......................... 363/17 |
| 2009/0237968 | A1 | * | 9/2009 | Dooley ........................... 363/97 |
| 2010/0157638 | A1 | * | 6/2010 | Naiknaware et al. ......... 363/131 |
| 2010/0309702 | A1 | * | 12/2010 | Yuan et al. .................... 363/131 |
| 2012/0081058 | A1 | * | 4/2012 | Bortolus et al. ............... 318/490 |

OTHER PUBLICATIONS

Soft Switched High Frequency AC-Link Converter; A Thesis by Anand Kumar Balakrishnan Submitted to the Office of Graduate Studies of Texas A&M University; Dec. 2008.
High-Performance UPS Based on AC-To-AC Converter; Yasunobu Suzuki, Isao Sugawara, Akira Takeuchi; IEEE 1998; Japan.
Simple Topologies of PWM AC-AC Converters; Fang Zheng Peng, Senior Member, IEEE, Lihua Chen, and Fan Zhang; IEEE Power Electronics Letters, vol. 1, No. 1, Mar. 2003.

* cited by examiner

*Primary Examiner* — Timothy J Dole
*Assistant Examiner* — Yusef Ahmed
(74) *Attorney, Agent, or Firm* — Weiss & Moy, P.C.; Jeffrey D. Moy

(57) ABSTRACT

An AC to AC power converter has a rectifier configured to receive an AC signal. An H-Bridge is coupled to the rectifier and the DC Filter. A processor is coupled to the rectifier and to the H-Bridge, wherein the processor is configured to produce a pulse to modulate a rectified input or a constant DC input to the H-Bridge. A wave filter is coupled to the H-Bridge and configured to modulate an output of the H-Bridge to an AC voltage of a desired frequency, wherein an output of the wave filter is coupled to the processor.

22 Claims, 5 Drawing Sheets

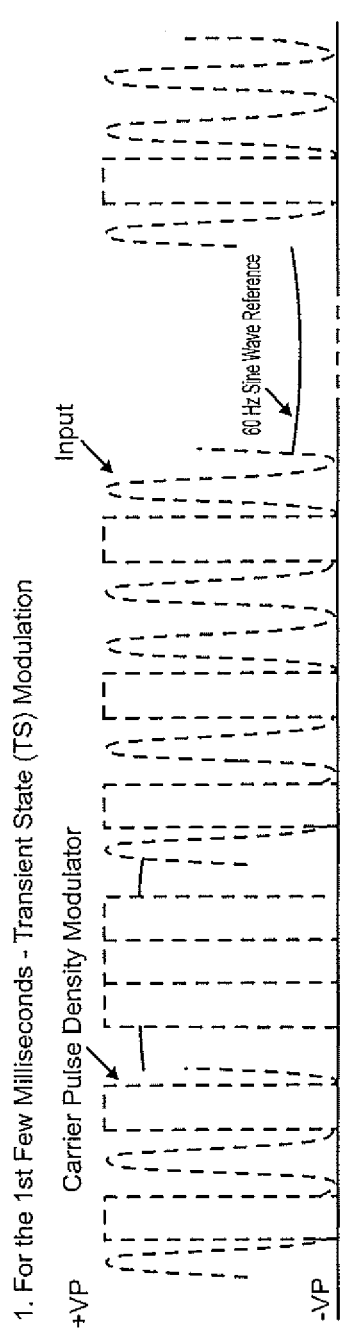
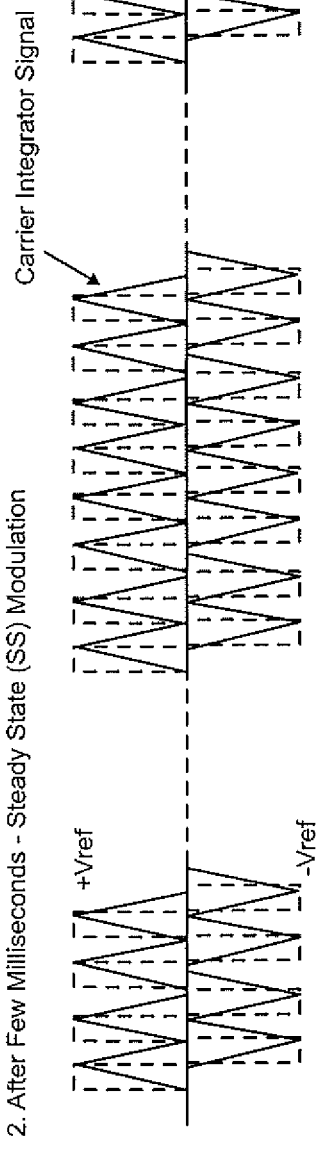
Fig. 5A
Fig. 5B

HIGH YIELD AC-AC POWER CONVERTER AND METHOD THEREFOR

BACKGROUND

Embodiments of this disclosure relate generally to power converters, and more particularly, to an Alternating Current (AC) to AC power converter that does not require a Direct Current (DC) link or storage devices.

Wind turbines and flywheels are types of renewable energy devices that output variable frequency, variable voltage, AC electric power. Therefore, power converters may be used to convert the variable-frequency, variable-voltage, AC electric power to fixed-frequency, fixed-voltage, AC power.

Wind turbine power systems spend a lot of time operating at light loads or fractions of their rated power capacities. These variable frequency drives typically employ dc voltage or current links for power distribution between the input and output converters and as a means to temporarily store energy. Thus, conventional power converters convert the generated AC power to DC power then to the required AC power. Unfortunately, this method renders a low yield conversion. Standard, state-of-the-art, power converters are designed to operate most efficiently at full power all, or nearly all, of the time. Therefore, when wind turbine-driven generators are operating in low wind, light load, conditions, standard power converters are inefficient.

Therefore, it would be desirable to provide a system and method that overcomes the above problems.

SUMMARY

An AC to AC power converter has a rectifier configured to receive an AC signal. An H-Bridge is coupled to the rectifier. A processor is coupled to the rectifier and to the H-Bridge, wherein the processor is configured to produce a pulse to modulate a rectified DC input to the H-Bridge. A wave filter is coupled to the H-Bridge and configured to modulate an output of the H-Bridge to an AC voltage of a desired frequency, wherein an output of the wave filter is coupled to the processor.

An AC to AC power converter has a rectifier configured to receive an AC signal. An H-Bridge is coupled to the rectifier. A DC filter is coupled to the rectifier and the H-Bridge. A processor is coupled to the rectifier and to the H-Bridge, wherein the processor is configured to produce a pulse to modulate a rectified DC input to the H-Bridge. An H-Bridge driver is coupled to the H-Bridge and the processor. A sine wave filter is coupled to the H-Bridge and configured to modulate an output of the H-Bridge to an AC voltage of a desired frequency, wherein an output of the wave filter is coupled to the processor.

A method for converting AC power, comprising: receiving an input AC signal; converting the input AC signal into a full wave rectified signal; producing a pulse to modulate the full wave rectified signal; sending the modulated full wave rectified signal to an H-Bridge; filtering an output signal of the H-Bridge to an AC voltage signal of a desired frequency.

The features, functions, and advantages can be achieved independently in various embodiments of the disclosure or may be combined in yet other embodiments.

BRIEF DESCRIPTION OF THE DRAWINGS

Embodiments of the disclosure will become more fully understood from the detailed description and the accompanying drawings, wherein:

FIG. 5A depicts transient state PWM scheme to achieve direct AC-AC high efficient power conversion; and FIG. 5B depicts a steady state modulation scheme PWM scheme to achieve direct AC-AC high efficient power conversion.

DETAILED DESCRIPTION

Figure 1:
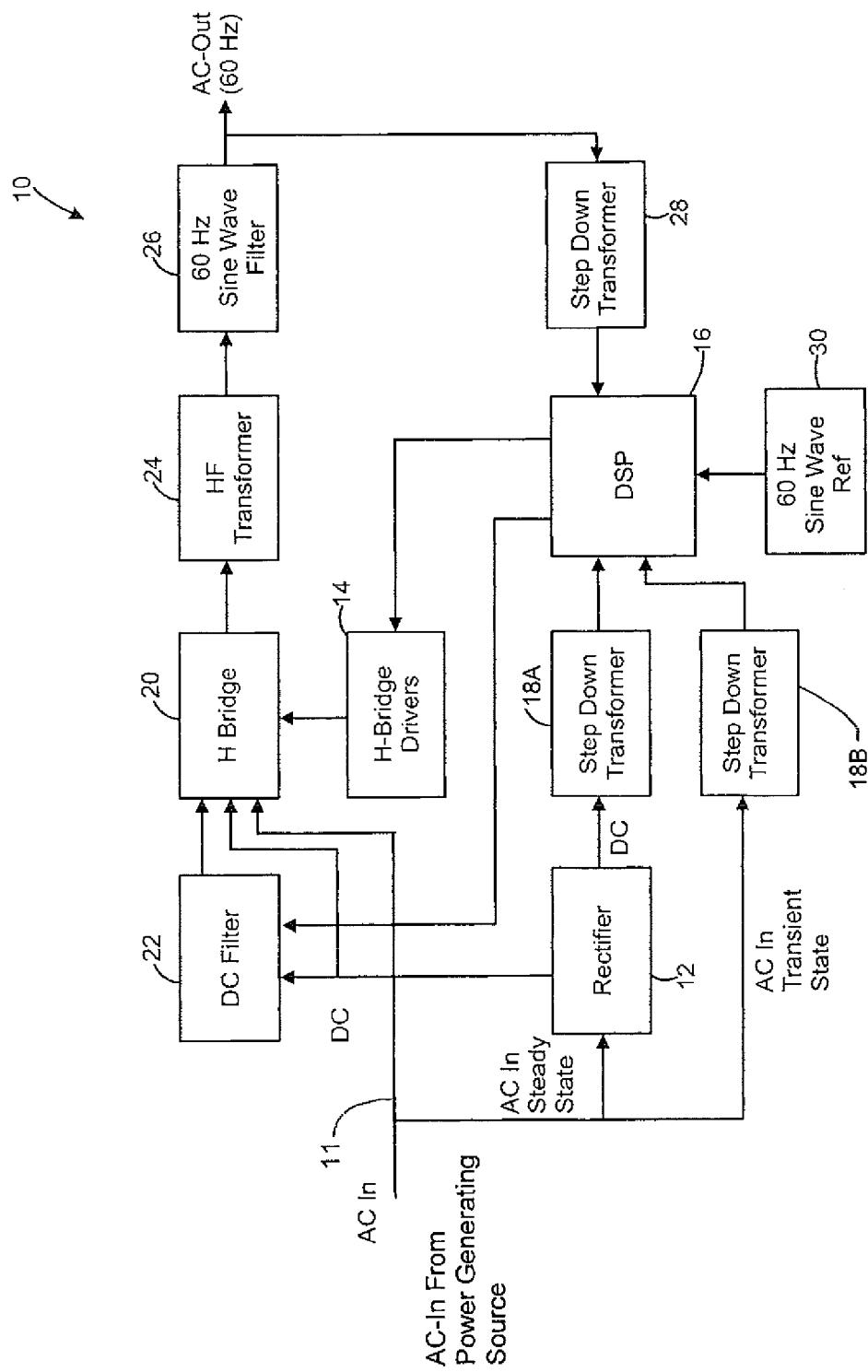
FIG. 1 is a simplified block diagram of a high yield AC-AC Power conversion system.

Referring to FIG. 1, an AC-to-AC power conversion system 10 (hereinafter system 10) is shown. The system 10 may provide direct AC-AC power conversion without a DC link or storage devices that produces a high efficiency conversion. The system 10 may convert variable-frequency, variable-voltage, AC electric power to fixed-frequency, fixed-voltage, AC power.

The system 10 may receive an AC input (AC-In) via signal line 11. The AC input AC-In may be variable-frequency, variable-voltage, AC signal. The AC input AC-In may be a signal generated by a wind turbine, a flywheel or the like. The above is given as an example and should not be seen in a limiting manner. During steady state operation, the AC input AC-In may be sent to an input power rectifier 12 (hereinafter rectifier 12). The rectifier 12 may be used to convert the AC input AC-In into a full wave rectified signal to one of constant polarity at its output. This may be done to extract a frequency content of the AC input AC-In for processing by a processor 16. In the embodiment shown in FIG. 1, the processor 16 is a Digital Signal Processor (DSP). However, this should not be seen in a limiting manner.

The rectified signal from the rectifier 12 may have a peak voltage that is not compatible with the processor 16. Therefore, a step down transformer 18A may be used to lower the voltage level of the rectified signal to one compatible with the processor 16.

The processor 16 may be used to produce a pulse to modulate the rectified signal from the rectifier 12 or the constant DC voltage(s) DC from the DC Filter 22 to an H-Bridge component 20. A device driver 14 may be used to allow the processor 16 to interact with the H-Bridge component 20. The device 14 may be a driver circuit or the like.

As shown in FIG. 1, the rectified DC signal DC may also be sent to a DC filter 22. The rectified DC signal DC may not be a steady signal. Thus, a DC filter 22 may be used to smooth the rectified DC signal DC to the H-Bridge component 20. The H-Bridge component 20 may enable a voltage to be applied across an output AC-Out in either direction.

Figure 2:
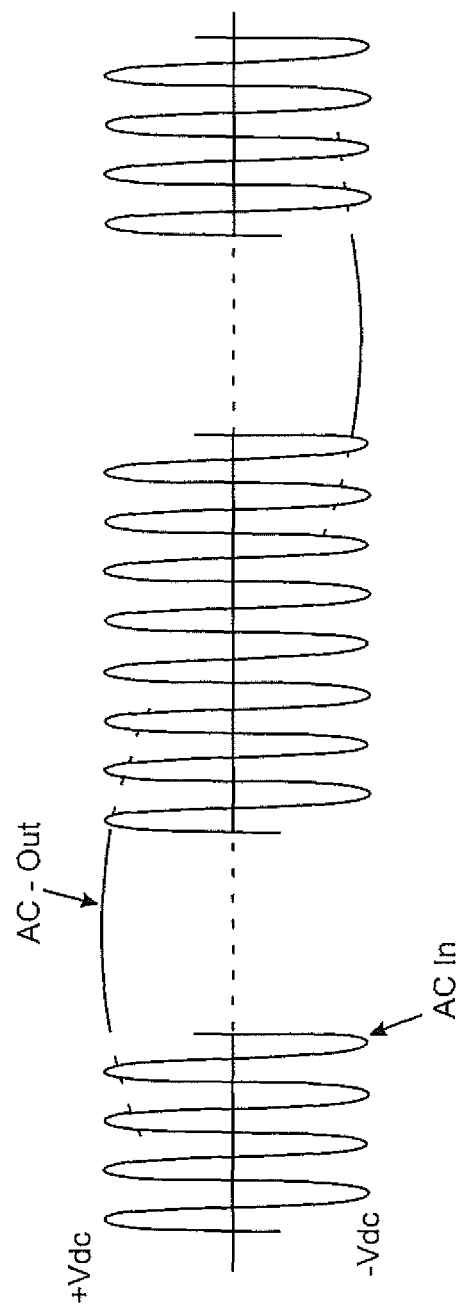
FIG. 2 is a diagram showing the power conversion output of the system of FIG. 1.

The output signal of the H-Bridge component 20 may be sent to a transformer 24. The transformer 24 maybe used to step down or to step up the peak voltages of the output of the H-Bridge component 20 to desired levels. The output of the transformer 24 may pass through a filter 26. The filter 26 may be used to produce a clean AC signal at the output AC-Out (See FIG. 2). FIG. 2 shows the output signal AC-Out from the system 10 for a specific input single AC-In on signal line 11. The filter 26 may be used to average the modulated voltages into an AC voltage signal of a desired frequency. In the embodiment of FIG. 1, the filter 26 is a 60 Hz Sine Wave Filter. The filter 26 is a low pass filter that averages the modulated voltages into a 60 Hz AC voltage signal at the output AC-Out. The filter 26 may also be used to removes transients and noise at the output. The filter 26 makes sure that the system 10 is stable at varying loads.

A feedback loop may be needed to control the AC voltage signal at the output AC-Out. Thus, the AC voltage signal at the output AC-Out may be sent back to the processor 16. Since the AC voltage signal at the output AC-Out may have a peak voltage that is not compatible with the processor 16, a step down transformer 28 may be used to lower the voltage level to one compatible with the processor 16.

A reference sine wave generator 30 may send an output to the processor 16. The processor 16 may compare the frequency of the AC voltage signal at the output AC-Out to the output of the reference sine wave generator 30. The processor 16 may then adjust the pulse signal used to modulate the rectified DC input to the H-Bridge component 20 and thus adjust the frequency of the AC voltage signal at the output AC-Out.

The processor 16 may be used to stabilize the AC voltage signal at the output AC-Out for the AC-In signal which may be at varying frequencies. The processor 16 operates differently for transient inputs (TS) and for steady state and low frequency inputs (SS), i.e. less than 1 KHz.

The TS AC conversion may be used to convert the transient or the first few cycles of the AC-In signal into the AC voltage signal of the desired frequency (60-Hz in the embodiment shown in FIG. 1). The AC-In signal may be sent to a step-down signal transformer 18B to interface the signal to the processor 16. The processor 16 may sample the signal and determines its periodic cycles. If the frequency is 1 KHz or above, the processor 16 may derive a control signal to be used for carrier generation. The processor 16 may derive the density of full wave cycles or the rectified signal from the rectifier to generate the desired output sine wave voltage. The processor 16 may utilizes the feedback from the AC voltage signal at the output AC-Out to add or subtract the density of the full wave cycles. Also, the processor 16 may sends a control signal to the filter 26 to select the ac-ac output topology.

In the low frequency AC conversion, the AC-In signal may be a full wave rectified signal with plus/minus voltage V. The filter 22 may be used to produce constant DC voltages DC at the input of the H-Bridge component 20. The output of the rectifier 12 may be connected to a step-down signal transformer to make the signal available to the processor 16. The processor 16 may sample the signal and determines its frequency. If the frequency is less than 1 KHz or if the rectifier is generating the +Vdc (SS), the processor 16 may derive a square wave signal for carrier generation. Also, the processor 16 may send a control signal to the filter 26 to select the ac-ac output topology to compensate for the input peak signal attenuation.

Figure 3:
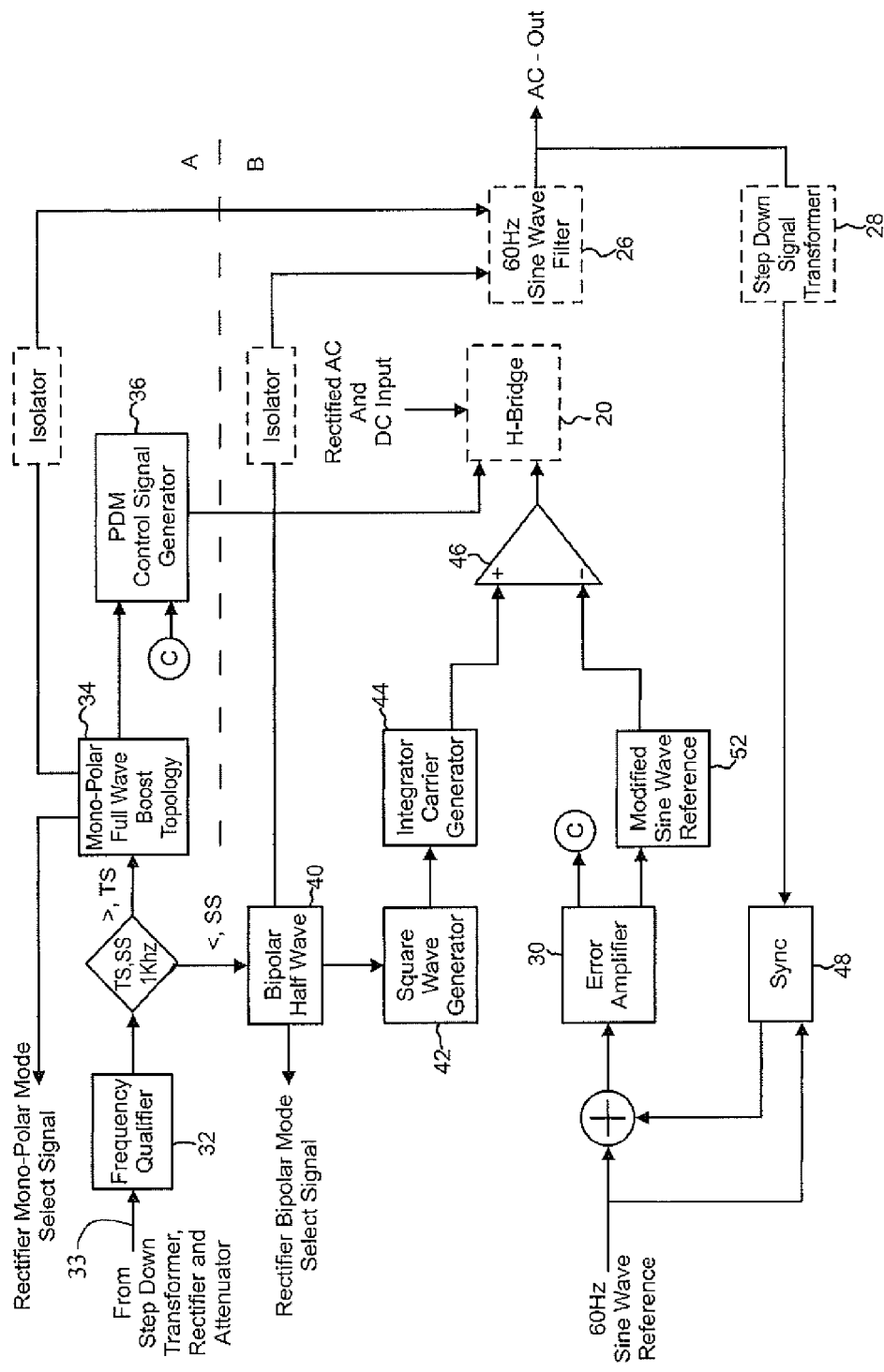
FIG. 3 is a flow chart showing operation of a processor used in FIG. 1.

Referring now to FIG. 3, operation of the processor can be described. The upper portion A depicted operation during the TS AC conversion process. The lower portion B depicts operation during the SS AC conversion process.

A frequency qualifier 32 may be used to determine the frequency of the signal 33 from the step-down signal transformer 18. If the frequency of the signal from the step-down signal transformer 18 is greater than 1 KHz, the signal may be sent to a boost topology 34. The boost topology 34 may be used to increase the voltage level of the signal at the output of the H-Bridge to a desired application. The signal may then be sent to a Pulse Density Modulator (PDM) generator 36.

The PDM generator 36 may be used to produce a pulse to modulate the rectified DC signal to the H-bridge 20 to generate the desired AC voltage signal at the output AC-Out. The PDM generator 36 may utilized a DSP processor to estimate the periodic cycle of the input to generate the clocking of the input through the H-Bridge AC interface. The output of a control clock may be continually synchronized with each input cycle. The DSP of the PDM generator 36 may use an adaptive PDM algorithm to adjust the pulse frequency of the control clock from the estimated amplitude, phase, and frequency of the referenced sine wave. The PDM generator 36 may have a feedback loop from the output AC-Out to add or subtract the density of the full wave cycles.

If the input frequency of the signal from the step-down signal transformer 18 is less than 1 KHz, a square wave signal may be produced for carrier generation. In FIG. 3, a signal from a bipolar half wave unit 40 may be sent to a square wave generator 42. An output of the square wave generator 42 may be coupled to an integrator carrier generator 44. The integrator carrier generator 44 may be the pulse width carrier modulator. At high frequencies input signals AC-In (i.e., greater than 1 KHz), the integrated signal may be a continuation of pulses to control the number of AC cycles that generates the desired AC voltage signal at the output AC-Out. At low frequency input signals AC-In, the integrated signal may be a continuation of ramp signals that may be used to modulate the output of the DC rectifier to generate the desired AC voltage signal at the output AC-Out. An output of the integrator carrier generator 44 may be sent to a comparator 46. The signal from the integrator carrier generator 44 is used as a reference for the comparator 46 to control the signal at the output AC-Out.

A feedback loop may be formed back to the comparator 46. An output of the step down transformer 28 may be sent to a synchronizer 48. The synchronizer 48 may be used to synchronize the output of the step down transformer 28 with the 60 Hz sine wave reference signal. An error amplifier 50 may be used to generate the difference between the 60 Hz sine wave reference signal and the signal at the output AC-Out. A modified sine wave reference signal generator 52 may be used to generate a modified 60 Hz reference signal which is sent to the comparator 46. Thus, if the amplitude of the signal at the output AC-Out is lower, the error generated may be positive to increase the output peak until it is equal or greater than the reference. If the signal at the output AC-Out is greater, then the error generated may be negative to lower the amplitude of the signal at the output AC-Out until it is equal or lower than the 60 Hz reference. Thus, the system 10 may provide a stabilized signal at the output AC-Out that may be equal to the 60 Hz reference.

Figure 4:
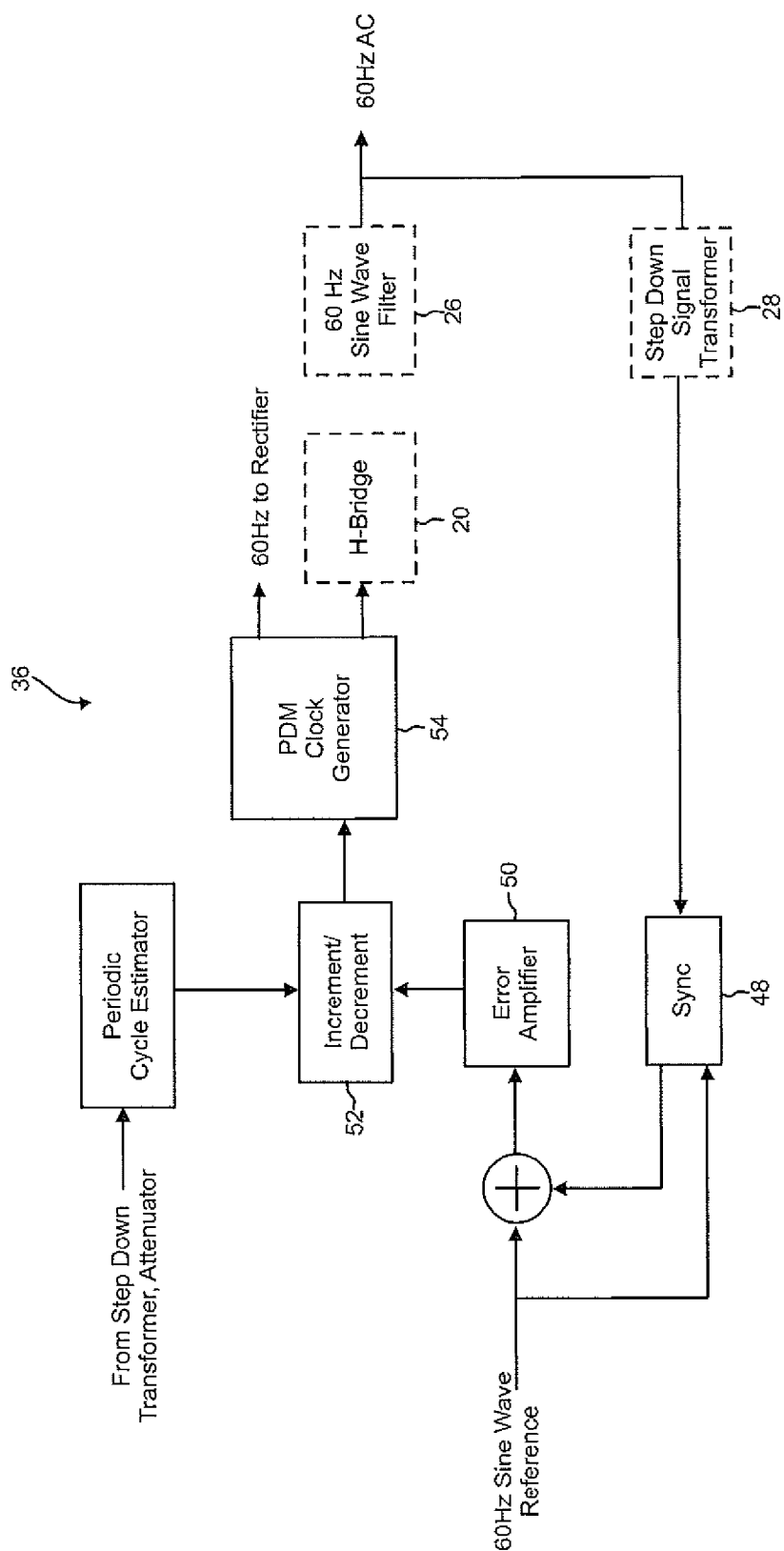
FIG. 4 is a simplified block diagram of a Pulse Density Modulator (PDM) control signal generator used in FIG. 3.

Referring now to FIG. 4, a block diagram of the PDM control signal generator 36 is shown. The output of the error amplifier 50 may be the error between the 60 Hz Reference source and the signal at the output AC-Out. The output of the error amplifier 50 may be sent to a calibrating device 52 to adjust the signal at the output AC-Out. The PDM clock generator 54 may be used to clock the periodic input voltages through the H-Bridge 20 to generate the desired signal at the output AC-Out. The inverse of the clocks may be used to generate the SS rectified dc voltage. When the rectified DC voltage reaches steady-state; the system 10 transfers the mode of operation from TS to SS mode.

The system 10 may provide direct AC-AC power conversion without a DC link or storage devices that produces a high efficiency conversion. The system 10 may provide a direct AC-AC power conversion principle that leads to the distinct conversion system with no dc-link energy storage components. This direct AC-AC conversion may be achieved by schemes that use pulse density modulation.

Referring now to FIG. 5, two modulation schemes may be utilized. In a High Speed Modulation, for the 1st few milliseconds after null, the carrier signal may be derived from the periodic cycling of the input signal AC-In. Each cycle may be sampled by the processor 16 (FIG. 1) to supply the required energy to transform the input periodic cycle into the desired frequency at the output AC-Out (60-Hz in FIG. 5). This may be necessary for high speed modulation to null the effects of the RC time constant of the DC filter 22. As shown in FIG. 5, the modulating signal may be synchronized with the input signal AC-In and the continuation of pulses to estimate a 60-Hz, ac output. The efficiency of this modulation scheme may be a function of the input frequency; the higher the frequency, the higher the efficiency of the ac-ac conversion. Also, the null cycles of the modulated signal may be used to clock the rest of the ac input cycles to the rectifier 12 (FIG. 1).

In Steady-State Modulation (FIG. 5b), after a few milliseconds when the Vdc has stabilized, traditional PWM scheme may be implemented. The PWM scheme may utilize a voltage DC link to convert the AC output. This method may be used to maximize power efficiency by storing the input energy in the form of DC voltage conversion.

While embodiments of the disclosure have been described in terms of various specific embodiments, those skilled in the art will recognize that the embodiments of the disclosure can be practiced with modifications within the spirit and scope of the claims.

What is claimed is:

1. An AC to AC power converter comprising:
   a rectifier configured to receive an AC signal source;
   an H-Bridge coupled to the rectifier;
   a processor coupled to the AC signal source, the rectifier and to the H-Bridge, wherein the processor is configured to sample the AC signal source to determine periodic cycles of the AC signal source, wherein the processor produces a pulse to modulate a rectified DC input to the H-Bridge when the AC signal source is above a predefined frequency and produces a square wave when the AC signal source is one of below the predefined frequency or in steady state; and
   a wave filter coupled to the H-Bridge configured to modulate an output of the H-Bridge to an AC voltage of a desired frequency, wherein an output of the wave filter is coupled to the processor.

2. An AC to AC power converter in accordance with claim 1, further comprising a DC filter coupled to the rectifier and the H-Bridge.

3. An AC to AC power converter in accordance with claim 1, further comprising a high frequency transformer coupled to the H-bridge and the wave filter.

4. An AC to AC power converter in accordance with claim 1, further comprising an H-Bridge driver coupled to the H-Bridge and the processor.

5. An AC to AC power converter in accordance with claim 1, further comprising a first step down transformer coupled to the rectifier and the processor.

6. An AC to AC power converter in accordance with claim 1, further comprising a second step down transformer coupled to the wave filter and the processor.

7. An AC to AC power converter in accordance with claim 1, further comprising a reference wave signal coupled to the processor.

8. An AC to AC power converter in accordance with claim 7, wherein the reference wave signal is a 60 Hz sine wave reference wave signal.

9. An Ac to AC power converter in accordance with claim 1, wherein the wave filter is a 60 Hz Sine wave filter.

10. An AC to AC power converter comprising:
    a rectifier configured to receive an AC signal;
    an H-Bridge coupled to the rectifier;
    a DC filter coupled to the rectifier and the H-Bridge;
    a processor coupled to the rectifier and to the H-Bridge, wherein the processor is configured to produce a pulse to modulate a rectified DC input to the H-Bridge when the AC signal source is above a predefined frequency and produce a square wave when the AC signal source is one of below the predefined frequency or in steady state;
    an H-Bridge driver coupled to the H-Bridge and the processor; and
    a sine wave filter coupled to the H-Bridge configured to modulate an output of the H-Bridge to an AC voltage of a desired frequency, wherein an output of the wave filter is coupled to the processor.

11. An AC to AC power converter in accordance with claim 10, further comprising a high frequency transformer coupled to the H-bridge and the sine wave filter.

12. An AC to AC power converter in accordance with claim 10, further comprising a first step down transformer coupled to the rectifier and the processor.

13. An AC to AC power converter in accordance with claim 10, further comprising a second step down transformer coupled to the sine wave filter and the processor.

14. An AC to AC power converter in accordance with claim 10, further comprising a reference wave signal coupled to the processor.

15. An AC to AC power converter in accordance with claim 14, wherein the reference wave signal is a 60 Hz sine wave reference wave signal.

16. An AC to AC power converter in accordance with claim 10, wherein the sine wave filter is a 60 Hz Sine wave filter.

17. A method for converting AC power, comprising:
    receiving an input AC signal;
    sending the input AC signal to a processor to sample the input AC signal to determine periodic cycles of the input AC signal;
    converting the input AC signal into a full wave rectified signal;
    producing a pulse to modulate the full wave rectified signal when the input AC signal is above a predefined frequency or a square wave when the input AC signal is one of below the predefined frequency or in steady state;
    sending the modulated full wave rectified signal to an H-Bridge;
    sending the modulated full wave rectified signal to a DC Filter; and
    filtering an output signal of the H-Bridge to an AC voltage signal of a desired frequency.

18. The method of claim 17, further comprising stepping down a frequency of the output signal of the H-Bridge to said desired frequency.

19. The method of claim 17, further comprising stepping down a voltage of the full wave rectified signal to form a carrier reference signal for a processor unit.

20. The method of claim 19, further comprising forming a control loop between the AC voltage signal of a desired frequency and the processor unit.

21. The method of claim 17, wherein receiving an input AC signal further comprises receiving the AC signal from a power generating device.

22. The method of claim 17, wherein receiving an input AC signal further comprises receiving the AC signal from a power generating device, the AC signal being of variable frequency.

* * * * *